United States Patent
Pircher et al.

(10) Patent No.: US 6,288,361 B1
(45) Date of Patent: Sep. 11, 2001

(54) METHOD AND DEVICE FOR JOINING FLAT PRODUCTS TO BE CONNECTED SUCH THAT THEY OVERLAP

(75) Inventors: Hans Pircher, Mülheim; Rudolf Kawalla, Bottrop; Gerd Sussek, Mülheim; Thomas Stegemann-Auhage, Dinslaken; Ralf Polzin, Herzogenrath-Kohlscheid, all of (DE)

(73) Assignee: Thyssen Stahl Aktiengesellschaft, Duisburg (DE)

( * ) Notice: Subject to any disclaimer, the term of this patent is extended or adjusted under 35 U.S.C. 154(b) by 0 days.

(21) Appl. No.: 09/242,020
(22) PCT Filed: Sep. 13, 1997
(86) PCT No.: PCT/EP97/05018
§ 371 Date: Mar. 22, 1999
§ 102(e) Date: Mar. 22, 1999
(87) PCT Pub. No.: WO98/14301
PCT Pub. Date: Apr. 9, 1998

(30) Foreign Application Priority Data

Oct. 1, 1996 (DE) ............................................. 196 40 612

(51) Int. Cl.[7] ............................ B23K 26/06; B23K 39/03
(52) U.S. Cl. ............................... 219/121.73; 219/121.85; 228/117; 228/158
(58) Field of Search ......................... 219/121.64, 121.73, 219/121.85; 427/556, 597; 148/525; 156/272.8; 228/117, 158, 165, 174, 173.6, 173.7, 173.2

(56) References Cited

U.S. PATENT DOCUMENTS

| | | | |
|---|---|---|---|
| 2,894,323 | * | 7/1959 | Sowter et al. . |
| 3,417,223 | * | 12/1968 | Steigerwald . |
| 4,011,982 | * | 3/1977 | Marancik . |
| 4,423,120 | * | 12/1983 | Paulus et al. . |
| 4,471,204 | * | 9/1984 | Takafuji et al. . |
| 4,826,736 | * | 5/1989 | Nakamura et al. . |
| 4,872,940 | * | 10/1989 | Strum et al. . |
| 4,912,297 | * | 3/1990 | Beyer et al. . |
| 4,917,969 | * | 4/1990 | Pircher et al. . |
| 5,170,031 | * | 12/1992 | Russell et al. . |
| 5,306,890 | * | 4/1994 | Minamida et al. . |
| 6,002,098 | * | 12/1999 | Pircher et al. . |
| 6,060,681 | * | 5/2000 | Bachhofer et al. . |

FOREIGN PATENT DOCUMENTS

| | | |
|---|---|---|
| 44 29 913 | 3/1996 | (DE) . |
| 195 02 140 | 5/1996 | (DE) . |

* cited by examiner

Primary Examiner—Tom Dunn
Assistant Examiner—Colleen P. Cooke
(74) Attorney, Agent, or Firm—Proskauer Rose LLP

(57) ABSTRACT

The invention relates to the joining of flat products of metallic materials to be interconnected overlapping. The joining takes place in a roll nip into which the flat products to be interconnected are introduced at an acute angle. Before they are pressed on one another in the roll nip, they are heated on their facing surfaces by radiation energy, but not melted. By a suitable profiling of at least one roller generated surface or one flat product the surface pressing is limited to the zone of the overlap joint and any flow of material transversely of the direction of the overlap joint is prevented.

9 Claims, 2 Drawing Sheets

Figure 1:
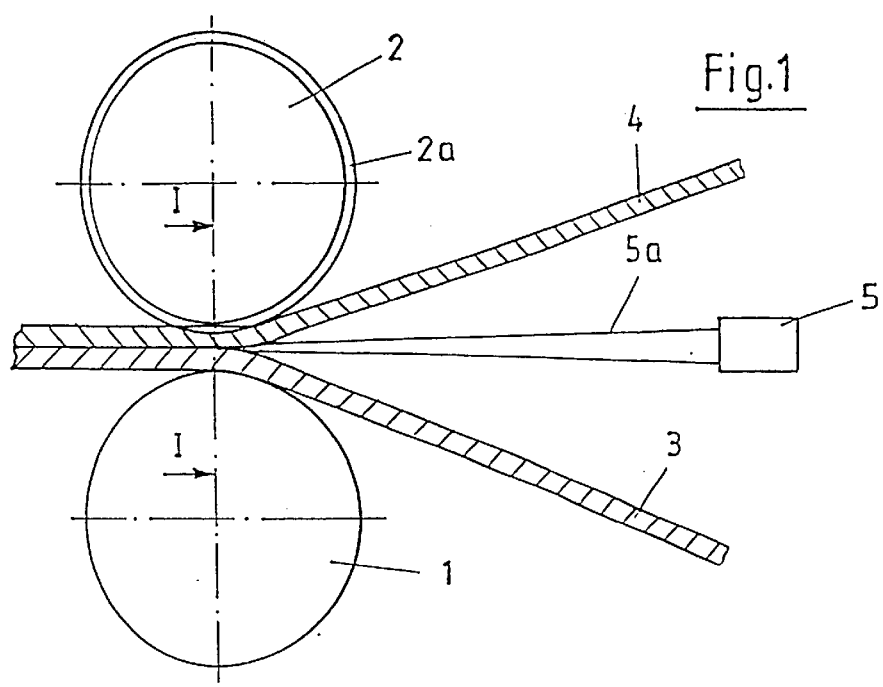

METHOD AND DEVICE FOR JOINING FLAT PRODUCTS TO BE CONNECTED SUCH THAT THEY OVERLAP

The invention relates to a process for joining flat products of metallic materials, more particularly in the form of strips, sheets and sheet blanks to be interconnected overlapping, which are introduced converging on one another at an acute angle into a roll nip and pressed on one another in the roll nip, after the surface of at least one of the flat products is heated by radiation energy immediately prior to its physical contact to the other flat product, although the basic material has not been melted. In contrast. low-melting coatings such as, for example, zinc, can be melted.

The invention also relates to an apparatus which is suitable for the performance of the process and which mainly comprises two rollers and a radiation source directed into the roll nip.

In one known process and known apparatus of the kind specified the radiation energy is generated by a laser beam source (DE 195 02 140 C1). During the heating a temperature can be maintained at which lower-melting coatings, such as zinc, do not yet evaporate, as any melting or vaporization of the coating material would have an adverse effect on the strength of the connection. The two rollers forming the roll nip have over their whole length a smooth cylindrical generated surface extending beyond the overlap joint on both sides. To apply the surface pressure required for the connection of the two flat products, after heating they are subjected to a shaping pass with a degree of deformation of $\leq 20\%$, which is small in comparison with rollbonded cladding. The rolling force required is considerable, since even unheated zones of the flat products alongside the overlap joint are involved in the heating. To prevent the softer flat product from being shorn off at the edge of the harder flat product, more particularly in the case of materials of different softness, the soft flat product is supported by the application of a counterpressure by means of a backing strip or by a suitably calibrated roller. In any case, the rollers also cause an undesirable reduction in the thickness of the adjacent zone of at least one flat product alongside the overlap joint. For these reasons the known process is not an optimum one.

It is an object of the invention to provide a process which can be more cheaply performed for joining flat products of metallic materials to be interconnected overlapping, more particularly different materials which can be interconnected by fusion welding only with difficulty, if at all, or materials of very different hardness, for example, steel/aluminium, or steel/copper, steel/titanium or steel/special steel, the invention providing an apparatus suitable for the performance of said process.

This problem is solved according to the invention in a process of the kind specified by the feature that the surface pressing in the roll nip is limited to the zone of the overlap joint. Preferably any flow of material of the flat product in the roll nip in the longitudinal direction of the overlap joint is prevented.

The problem is solved by an apparatus characterized in that of the two rollers one roller generated surface with its operative pressure zone in its axial extension is shorter than the total axial length of the rollers; preferably the roller generated surface with its operative pressure zone has circularly extending grooves.

The limitation of the surface pressing in the roll nip to the zone of the overlap joint, more particularly in conjunction with influencing the flow of material, enables the pressure necessary for joining to be applied with a lower rolling force than in the prior art process wherein even unheated material is involved in the reduction pass. If a comparison is made with the rolling force required for a St14Z/AlMoSi connection, a reduction is found from 60 kN, in the case of an aluminium strip 25 mm wide in the conventional process, to 5 kN for the process according to the invention with a width of overlap of 9 mm. The efficiency of shaping is therefore optimum in relation to the radiation energy introduced. This has the further consequence that the required apparatuses can be constructed substantially lighter. The limitation to a comparatively narrow zone, where surface pressing takes place, also facilitates the joining of sheet blanks of defined shape (e.g., so-called "tailored blanks"), wherein the joint frequently extends not straight, but in curves. Precisely in the case of constructional components made up of different flat products, which are differentially dimensioned in accordance with their stressing in operation, but not only in the case of such constructional components, it is important that the constructional components adjacent the overlap joint should not be adversely affected by the joining. Since in the process according to the invention the heating and shaping are limited to the overlap joint, on the one hand the heat-affected zone is as small as possible and on the other hand the full thickness of material is maintained in the adjacent zones of the flat products, something which was impossible in the prior art process with the reduction pass.

According to further features of the invention, advantageously the surfaces of the two flat products are heated. It has been found to be advantageous if the two flat products are of materials of different softness, the widths of the overlap joint is at least equal to 1.5 times the thickness of the flat product of the softer material.

The aforementioned prevention of the flow of material of the flat product longitudinally of the overlap joint can be achieved constructionally in various ways. The essential feature of these embodiments of the invention is that the material can flow into receiving spaces of the elements participating in the surface pressing. For example, in one alternative the surface at least one of the elements participating in the surface pressing (roller/flat product) is profiled. The surface profiling preferably comprises peripheral/ longitudinal grooves. In that case the grooves allow adequate surface pressing, but at the same time prevent any flow of material longitudinally of the overlap joint, since the material can flow into the grooves. They also serve to guide the flat products in the direction of the overlap joint. The grooved roller preferably acts on the softer base material. One of the base materials is grooved, preferably the harder one is selected.

Figure 2:
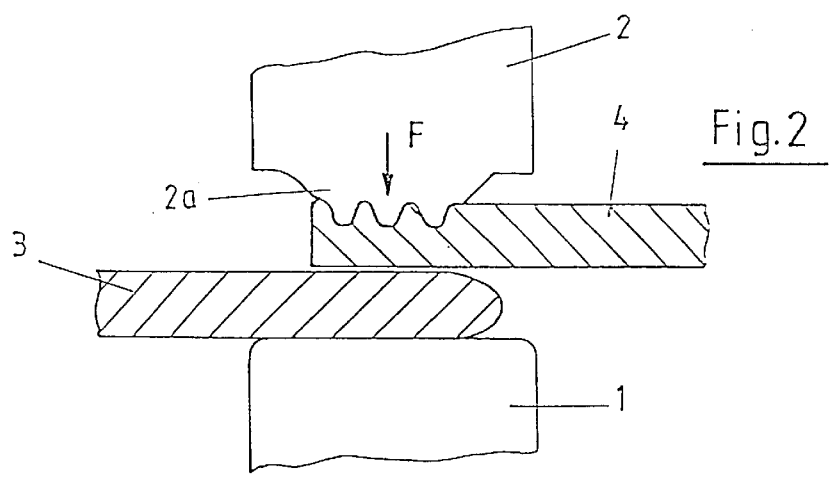
Figure 3:
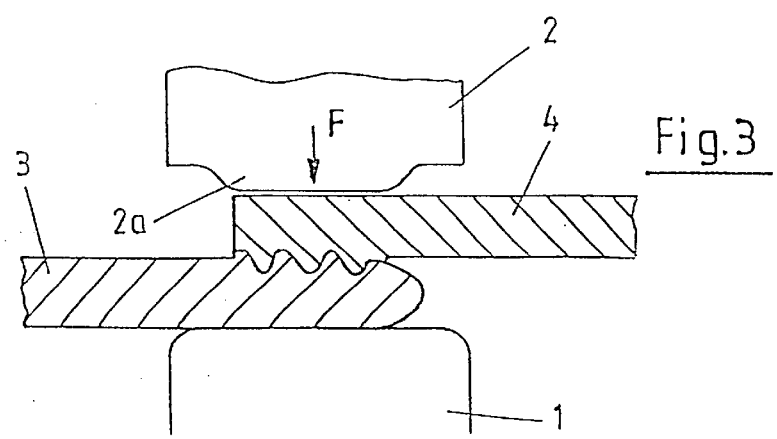
Figure 4:
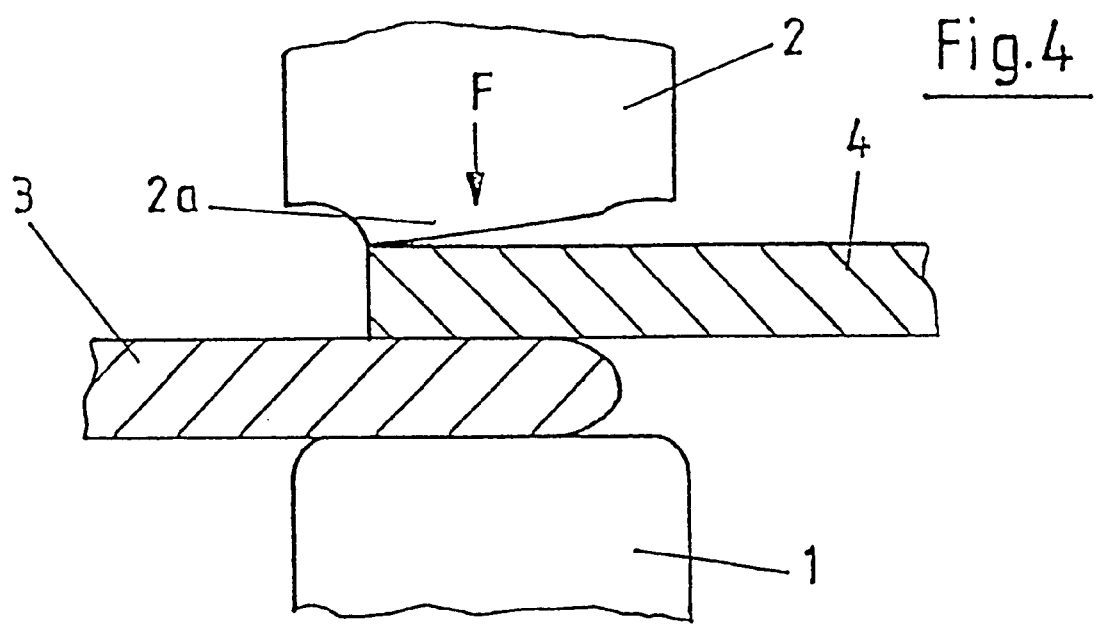

The invention will now be explained with reference to the diagrammatic drawings, which illustrate two possible alternative ways of performing the process according to the invention and which show:

FIG. 1 an apparatus adjoining two strips or sheets in vertical longitudinal section, FIG. 2 the apparatus shown in FIG. 1, sectioned along the line I—I in FIG. 1, FIG. 3 the apparatus shown in FIG. 1 in a variant, sectioned along the line I—I in FIG. 1, and FIG. 4 the apparatus shown in FIG. 1 in another variant, sectioned along the line I—I in FIG. 1.

Referring to FIG. 1, an apparatus has two rollers 1, 2, of which one roller 1 has a cylindrical generated surface 1, the other roller 2 having a generated surface with a circularly extending raised zone 2a. The zone 2a of the generated surface cooperates with the cylindrical generated surface of one roller 1 to form a roll nip into which two flat products 3, 4 supplied overlapping are introduced converging with one another at an acute angle preferably smaller than 15°, more particularly 10°. The two facing surfaces of the flat products 3, 4 are heated in the gusset at the roll nip by means of a beam 5a of a laser beam source 5 only over the width of the overlap joint, without reaching the melting temperature of the base material of the flat products 3, 4. The two flat products 3, 4 are then connected in the zone of the roll nip by surface pressing in the zone of the overlap joint. The details of the surface pressing can be gathered from FIGS. 3 and 4.

In the first alternative embodiment (FIG. 2) the raised zone 2a of the generated surface of the roller 2 is limited to the width of the overlap joint. In addition to this, the raised zone is multiply grooved in the peripheral direction.

The embodiment illustrated in FIG. 3 differs from that shown in FIG. 2 only by the feature that the raised zone 2a is not grooved. Instead, one of the two flat products, namely the flat product 4 is formed with a multiple grooving extending in the direction of the overlap joint. The grooving is preferably introduced into the harder material.

Due to the raised zone 2a, in both embodiments the pressure in the roll nip is limited to the zone of the overlap joint. This limitation of the surface pressing guarantees that the two flat products 3, 4 are shaped only in the zone of the overlap joint. If grooves are provided, they prevent any material from flowing in the longitudinal direction of the overlap joint, since the material can enter the grooves. They also encourage the guiding of the flat products 3, 4 in the longitudinal direction of the overlap joint.

Another alternative is shown in FIG. 4, wherein the raised zone 2a is constructed conical. This embodiment encourages the flow of material in the transverse direction and prevents flow in the longitudinal direction. Other advantages of the process according to the invention are that the flat product is not strain-hardened and/or heat-affected outside the overlap zone, and the connection produced can be cold-worked. This also makes it possible to prepare—e.g., to round—the edge of the other flat product, something which also has a favourable effect on any subsequent cold working.

What is claimed is:

1. A process for joining flat products of metallic materials, to be interconnected overlapping, which are introduced converging on one another at an acute angle into a roll nip and pressed on one another in the roll nip, after the surface of at least one of the flat products is heated by radiation energy immediately prior to its physical contact to the other flat product, although the basic material has not been melted, characterized in that the surface pressing in the roll nip is limited to the zone of the overlap joint.

2. A process according to claim 1, characterized in that the two flat products are heated.

3. A process according to claim 1, characterized in that if the two flat products are of materials of different softness, the widths of the overlap joint is at least equal to 1.5 times the thickness of the flat product of the softer material.

4. A process according to one of claim 1, characterized in that any flow of material of the or each flat product in the roll nip in the longitudinal direction of the overlap joint is prevented.

5. A process according to claim 4, characterized in that to prevent the flow of material, use is made of either a flat product formed with longitudinal grooves extending in the direction of the overlap joint, or a roller formed with peripheral grooves in the operative pressure zone.

6. A process according to claim 4, characterized in that to prevent the flow of material use is made of a conically calibrated roller.

7. A process according to claim 1, characterized in that the flat products are strips, sheets or sheet blanks.

8. An apparatus for joining flat products of metal materials to be interconnected overlapping, comprising two rollers and a heat radiation source directed into the roll nip, characterized in that of the two rollers one roller generated surface with its operative pressure zone in its axial extension is shorter than the total axial length of the rollers.

9. An apparatus according to claim 8, characterized in that the roller generated surface with its operative pressure zone has circularly extending grooves.

* * * * *